Sept. 7, 1926.
W. BIXBY
TUBE FRAME
Filed May 10, 1924
1,599,377
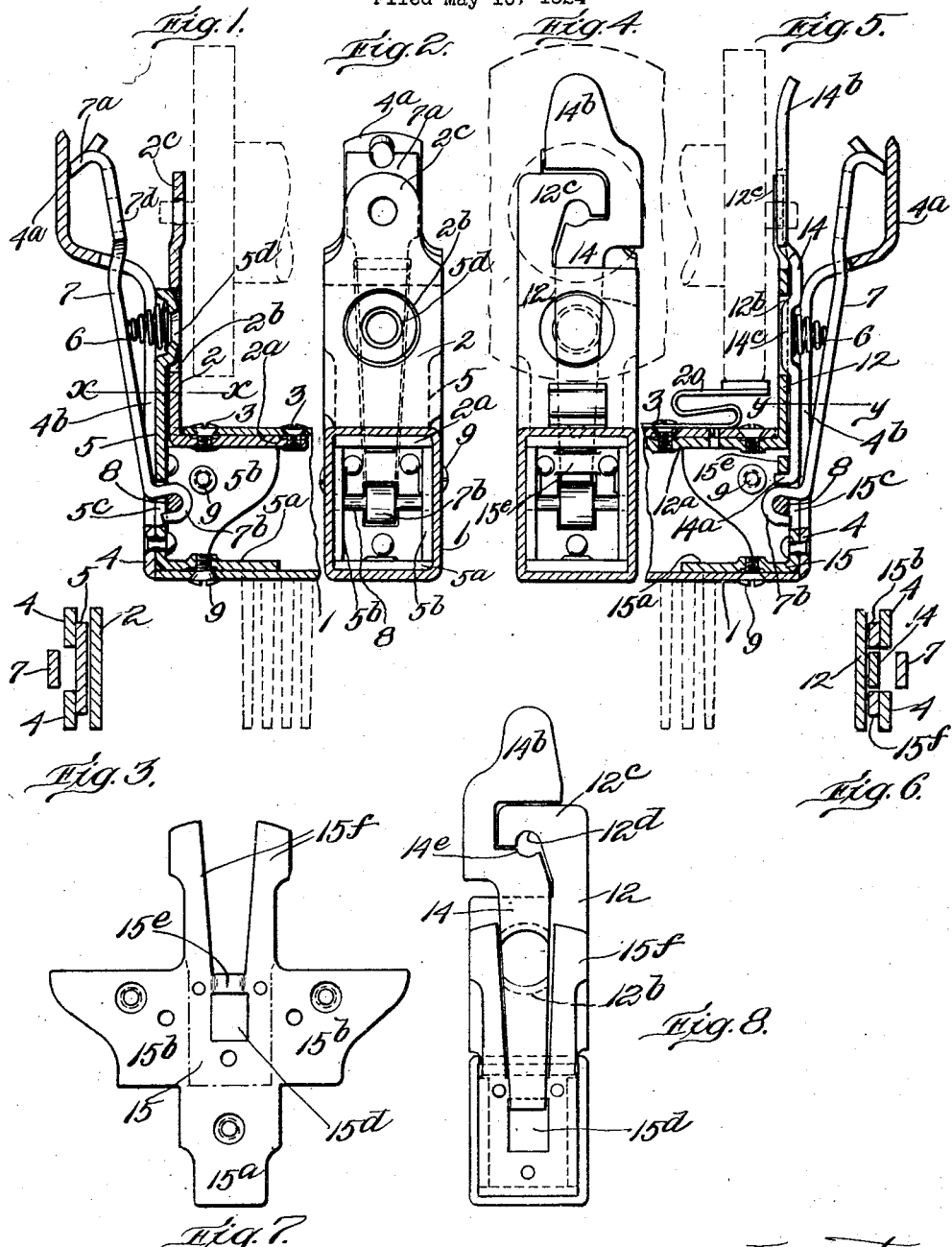

Patented Sept. 7, 1926.

1,599,377

UNITED STATES PATENT OFFICE.

WALTER BIXBY, OF BOSTON, MASSACHUSETTS, ASSIGNOR TO SHAWMUT ENGINEERING COMPANY, OF BOSTON, MASSACHUSETTS, A CORPORATION OF MASSACHUSETTS.

TUBE FRAME.

Application filed May 10, 1924. Serial No. 712,445.

This invention relates to tube frames for tuft weaving, and is intended to provide a simple and effective construction for suspending the tube frame from the usual carrier chains, while making provision for removably supporting the yarn-spool in operative relation for the delivery of yarn to the tuft tubes so that the frame-suspending means may be detached or removed from the rest of the structure while still leaving the yarn-spool undisturbed in its bearings.

To secure reliable and durable service it is essential that the suspending means of the tube frame and the spool-supporting brackets should be brought together into a very exact operative relationship and that the construction for securing them shall be strong and rigid so as to avoid displacement or disalignment through the bending, distortion or loosening of the various parts of the structure.

To this end the invention comprises, generally speaking, suspension members of rigid construction provided with means for firmly and rigidly securing them to the carrier bar, combined with spool-bearing brackets properly located and of rigid construction, firmly secured to the structure by separate attaching means, provision also being made for the easy removal and replacement of the yarn-spool.

This and other features of the invention will be explained in the following specification and will be defined in the claims hereto annexed.

In the accompanying drawings I have illustrated a simple and convenient construction and arrangement embodying the principles of this invention, in which:

Figure 1 is a vertical central section showing the construction and arrangement by which the spool-bearing bracket and the tube frame suspension means are respectively secured to the carrier bar.

Figure 2 is a side elevation of the spool bracket and suspension means as viewed from the inside or middle portion of the tube frame.

Figure 3 is a cross section of the spool bearing bracket and suspension means on plane $x$—$x$, Figure 1.

Figure 4 is an inside elevation of the spool-bearing bracket and latch with the outer frame suspension means removed.

Figure 5 is a vertical central section of the opposite end of the tube frame to that shown in Figure 1, showing the suspension means and spool bearing members constructed and arranged to permit the adjacent spool journal to be conveniently removed from the spool bearing members to permit withdrawal of the spool.

Figure 6 is a cross sectional view of the spool bearing bracket and suspension members on the plane $y$—$y$, Figure 5.

Figure 7 is a flat development of the connecting member for connecting the suspension means with the carrier bar at the right hand end of the tube frame.

Figure 8 is a side elevation of the releasable spool bearing members and the connecting member for securing the frame-suspending means to the carrier bar.

The carrier bar 1, has hollow end portions into which are inserted the various wings or inward extensions by which the suspension means and the spool-supporting bracket are respectively rigidly secured to the carrier bar.

The spool-bearing bracket at the left end of the tube frame, shown in Figure 1, comprises a rigid arm or bracket 2, whose lower portion is bent at substantially right angles to be inserted between the side walls of the hollow end portion of the carrier bar 1, as shown at $2^a$, and are provided with tapped holes to receive fastening screws 3 by which the spool bearing bracket is rigidly and firmly secured in place, said bearing bracket being of stiff or rigid material so as to avoid any displacement or distortion by bending. At its upper end the spool bracket terminates in a perforated hollow bearing ear $2^c$ which forms a closed bearing for receiving the adjacent journal of the yarn-spool whose outline is indicated in dotted lines. The spool bearing bracket, intermediate of the carrier bar at its upper end, is provided with a recess or aperture $2^b$ adapted to receive the inwardly projecting boss $5^d$ of the connecting member 5, but it will be observed that the bearing bracket is not secured directly to the suspension means but merely abuts against the inside face of the suspension construction, as will presently be described.

The main hanger arm 4 is provided at its upper end with an outwardly offset chain-penetrating tongue or extension $4^a$, and is provided with an open slot or recess 4ᵇ along its medial line which forms a vertical recess for the reception of the rigid hook arm or latch 7, whose upper end terminates in a chain-engaging hook 7ᵃ, and whose lower end terminates in a loop or eye 7ᵇ forming a supporting bearing about the transverse fulcral pin 8 to permit the hook to swing inward to be disengaged from the chain and allow the tube frame to be carried from the chain to its proper position for feeding the tuft elements between the warp by suitable transfer mechanism not herein shown.

The means for attaching the suspension members to the carrier bar 1, comprises a vertical plate 5 of pressed steel or the like, whose upper end is perforated and formed into a hollow boss or cup 5ᵈ forming a shallow recess or seat for the reception of a spiral spring 6, whose outer end thrusts against the opposite portion of the inside face of the hook arm 7 to normally keep the hook arm in chain-engaging position when the tube frame is suspended from the usual carrier chains.

The lower portion of the connecting member 5 is formed with an inwardly projecting bottom wing or attaching member 5ᵃ and with parallel side wings 5ᵇ, the three wings forming a close engagement against the inside faces of the bottom and side walls of the hollow end portion of the carrier bar. Fastening means, such as the screws 9, are passed through bottom and side walls of the carrier bar and are tapped into threaded apertures in the wings 5ᵃ, 5ᵇ. Preferably the lower end of the main hanger arm 4 is dimensioned so that its bottom and side edges are practically flush with the exterior edges of the carrier bar, while the connecting member 5 is just enough narrower so that the wings 5ᵃ, 5ᵇ, telescope snugly inside the hollow end of the bar, leaving the end edges of the bar abutting firmly against the inside face of the hanger 4 around the edge of its lower portion.

The suspension arm 4 is riveted or otherwise secured firmly to the connecting member 5 so that the connecting member forms a rigid re-enforcement for the bar 4 which projects across the open vertical slot 4ᵇ, thus avoiding weakening of the suspension arm by providing this slot for the reception of the hook 7 when infolded into flush relationship with the outer face of the hanger arm.

The recess or opening 2ᵇ, in the spool-bearing bracet, is dimensioned to allow the boss 5ᵈ of the connecting member to project therein and thus allow the connecting member and the spool-bearing bracket to abut face to face for mutual support.

The fulcral pin 8 is inserted in aligned apertures formed in the opposite wings 5ᵇ, and is kept from longitudinal displacement when the suspension members are attached to the carrier bar by the opposite side walls of the carrier bar. The lower fulcral end of the hook arm 7 is passed through an aperture or opening 5ᶜ, as well as through the longitudinal slot 4ᵇ, after which the fulcral pin 8 is inserted to hold the parts in assembled position, this being done before the suspension means are inserted in the hollow end of the carrier bar and secured therein. It will be seen that the suspension members can be easily removed and disassembled while leaving the spool bearing bracket still in position to support the yarn-spool so that the yarn-spool is not disturbed or dropped when the hanger is taken off.

The construction at the opposite end of the carrier bar, while similar in principle to that already described, differs in detail in order to make provision for the quick removal and insertion of the yarn-spool journal. It employs the vertical hanger arm 4 and the pivotal hook latch 7 mounted on the fulcral pin 8, similar to that already described.

The spool-bearing-bracket 12, while having its inwardly turned lower end 12ᵃ formed for insertion into the end of the carrier bar and to be fastened by screws 3, is somewhat differently formed at its upper end since said upper end is cut away, as shown in Figure 8, to form an overhanging bearing ear 12ᶜ recessed in its lower edge, as shown at 12ᵈ, to form an open bearing for the adjacent spool journal. This bearing bracket 12, like bearing bracket 2, is of rigid or comparatively unyielding material so as to preserve a uniform position without distortion from bending. The journal is kept seated in the downwardly exposed bearing recess 12ᵈ by the upward pressure of the spring spool brake 20 which is secured against the top face of the carrier bar 1, by one of the attaching screws 3 by which the spool-bearing bracket is itself secured to the carrier bar. To prevent accidental displacement or to form a disconnectible lock for the underside of the journal I provide a latch member 14, whose edge portion 14ᵉ forms the lower side of the journal bearing recess and whose lower end is formed inwardly to form a hook 14ᵃ which is inserted in the lower portion of the connecting member 15 to permit the journal-locking latch or detent 14 to be swung outwardly against the pressure of an interposed coil spring 6, which is inserted in a depressed or cup-like seat 14ᶜ, the outer end of said spring thrusting against the hook arm 7.

The construction of the connecting plate for the right hand end of the carrier bar is correspondingly changed. This connecting plate 15 has the same construction of attaching wings 15ᵃ, 15ᵇ, for interiorly engaging the bottom and side walls of the hollow end portion of the carrier bar. It also has a middle recess or opening 15$^b$ through which the lower bent end of the hook arm 7 is inserted when held in place on the interior fulcral pin 8. The upward extension of the connecting member 15 is slotted to form two separated arms or extensions 15$^f$ the space between them being separated from the interior opening 15$^d$ by means of the cross arm 15$^e$ which, as shown in Figure 5, is inwardly offset to project somewhat inside of the main plane of the member 15, 15$^f$, so as to allow the journal-locking detent 14 to hook beneath it and lie flush with the upwardly extending arms 15$^f$ when in normal journal-retaining position. The spool bearing bracket 12 is provided with a recess or aperture 12$^b$, to admit the spring-retaining boss 14$^c$ of the journal latch 14. The cross sectional view in Figure 6 shows how the hanger 4, the hook 7, the journal latch 14 and the spool-bearing bracket 12 are located with reference to the spaced arms 15$^f$ of the connecting member when the parts are in the position shown in Figure 5. It will be seen that the spring 6 exerts an opposite thrust against the journal latch 14 and the chain-engaging suspension hook 7, the spring passing through the slot 4$^b$ in the main hanger arm 4. The journal latch 14 seats itself between the two spaced arms 15$^f$, as shown in Figure 8. By pressing outward on the tip 14$^b$ with the finger the journal-retaining latch moves over beyond the end of the journal, as shown in dotted lines, thereby allowing the spool to be depressed against the action of the spring brake 20 which engages the periphery and its head, and thus allows the easy removal of the spool-journal from its bearing bracket. When the right hand end of the spool has thus been disengaged the whole spool may be turned endwise to withdraw the opposite journal from the closed bearing 2$^c$.

It will be observed that with the construction shown and described it is not necessary to make any of the suspension or bearing parts of spring metal which becomes easily deflected and distorted in use. All these supporting parts may be made of a substantial thickness of pressed steel so that they will be sufficiently rigid to retain a normal position with distortion from usage. Moreover, as the suspension means and the spool-bearing bracket are separately secured to the carrier bar by their respective fastening devices or screws, the spool and the spool-bracket is not in the least disturbed if the suspension means should be removed or broken off. Since the inturned foot of the spool bearing bracket overlaps both the attaching wings 5$^b$ and the top wall of the carrier bar, the wings 5$^b$ may be so dimensioned as to reenforce the engagement between the inturned foot of the bearing bracket and the top wall of the carrier bar by firm engagement therewith, which engagement still further stiffens the structure. By extending the connecting member 5 upward beyond the carrier-bar, reenforcement is afforded to the upstanding portions of the bearing bracket on the one side and the suspension hanger on the other.

What I claim is:

1. In a tube frame for tuft weaving, the combination with a carrier-bar, suspension means embracing a chain-penetrating hanger and a co-acting hook latch, attaching means embracing inwardly projecting wings adapted to form supporting engagement with the bottom and side walls of the hollow end portion of the carrier bar, a fulcral pin carried by said wings for supporting the hook latch, said pin being kept from displacement by engagement with the opposite side walls of the carrier-bar, an angular spool-bearing bracket separately secured to the top wall of the carrier-bar to extend upwardly inside the suspension means in position to support a spool journal, and a spring interposed between the hook latch and the spool bearing substantially as described.

2. In a tube frame for tuft weaving, the combination with a carrier-bar, suspension means embracing a chain-penetrating hanger and its coacting hook latch, attaching means embracing inwardly turned attaching wings disposed to form telescoping engagement with the side and bottom walls of the hollow end portion of the carrier-bar, a spool bearing bracket whose inturned angularly disposed lower portion is rigidly secured to the top wall of said carrier-bar, said spool bracket being provided, intermediate of its ends, with a recess to receive an inwardly projecting spring-receiving boss formed on the suspension means, and a spring seated in said boss to thrust outwardly against the hook latch, substantially as described.

In witness whereof, I have subscribed the above specification.

WALTER BIXBY.